No. 768,364. PATENTED AUG. 23, 1904.
T. R. HINES.
PAINTER'S APPLIANCE.
APPLICATION FILED JULY 27, 1903.

NO MODEL.

Witnesses
Inventor
Thomas R. Hines
by Crosby & Gregory
attys

No. 768,364. Patented August 23, 1904.

UNITED STATES PATENT OFFICE.

THOMAS R. HINES, OF BROCKTON, MASSACHUSETTS, ASSIGNOR OF ONE-HALF TO FRANK M. JOY, OF BROCKTON, MASSACHUSETTS.

PAINTER'S APPLIANCE.

SPECIFICATION forming part of Letters Patent No. 768,364, dated August 23, 1904.

Application filed July 27, 1903. Serial No. 167,110. (No model.)

*To all whom it may concern:*

Be it known that I, THOMAS R. HINES, a citizen of the United States, residing at Brockton, county of Plymouth, State of Massachusetts, have invented an Improvement in Painters' Appliances, of which the following description, in connection with the accompanying drawings, is a specification, like letters on the drawings representing like parts.

My invention is an improvement in a combination of paint-pots so arranged and constructed as to be capable of convenient use separately or together, as desired, and provided with means so that when used together they interlock and are capable of being carried and used as one article. Other features of my invention reside in so constructing them that the pots when empty may be nested together conveniently, may readily be cleaned or "burned out," providing convenient means for holding the brushes, and for suspending or supporting the combined paint-pots on a ladder or other convenient place.

Figure 1:
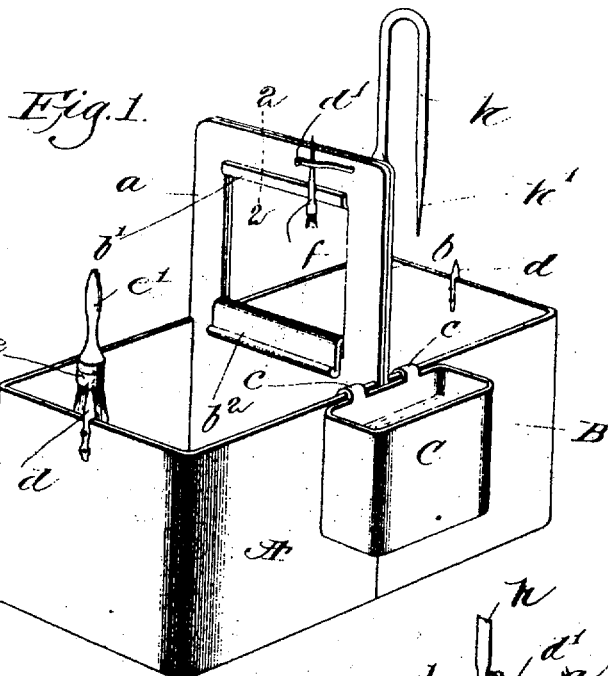
Figure 2:
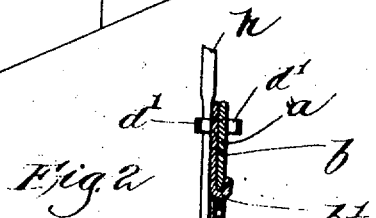
Figure 3:
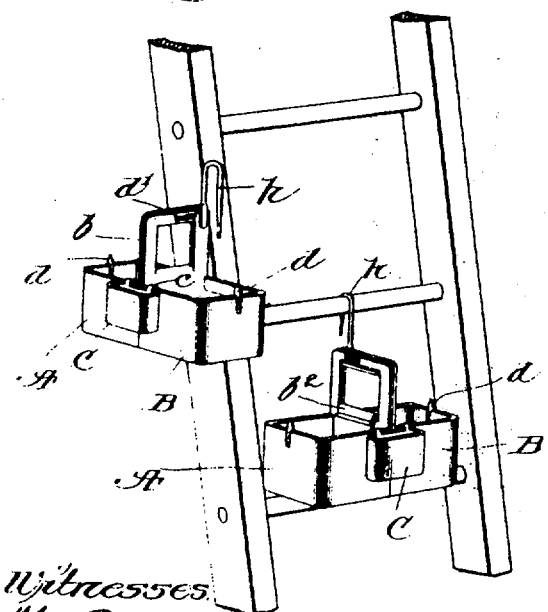

In the drawings, Figure 1 shows in perspective a set of paint-pots constructed and combined according to my invention. Fig. 2 is a fragmentary view in vertical longitudinal section taken on the line 2 2, Fig. 1. Fig. 3 is a perspective view of a portion of a ladder, showing how my improved painters' "assistant," as it may be called, can be conveniently applied thereto.

As herein shown, I provide three separate pots or receptacles A B C, herein shown as rectangular in shape and decreasing in size so that the pot C may be placed within B and then the latter within A. At corresponding sides of the pots A and B a handle or extension $a\ b$, preferably formed integrally with the side of the paint-pot, is provided, so that when the two pots are brought side by side, as shown in Fig. 1, these two handles form a central handle for the combination of pots, each bracing the other and being strong, neat, simple, and effective. One of these handles is provided with a short upturned lip $b'$ and a longer downturned lip $b^2$, the aperture $a'$ in the opposite handle being slightly deeper than the corresponding aperture or opening in the other handle, so as to provide a space $a^2$, as clearly shown in Fig. 2, when the two handles have been properly interlocked. This permits the handles to be interlocked in the manner shown in Fig. 2, while at the same time enabling them to be quickly disengaged simply by raising the pot A until its handle escapes from the lip $b'$, whereupon said handle is sprung away from said lip and the pot lowered until it is entirely free from the lip $b^2$, and thereby separated completely from the pot B. The pot C is provided with hooks $c$, spaced apart so as to permit them to be engaged, respectively, with the two larger pots, as shown clearly in Figs. 1 and 3.

At different points, herein shown as at the ends of the two larger pots, I provide upwardly-projecting pins $d$ for catching beneath the band $e$ of the paint-brushes, which may be used for the respective colors contained in the several pots, one brush, $e'$, being herein indicated as so secured. At the handles I provide spring-clips $d'$ for securing the smaller cutting-in brushes, as indicated at $f$. At their upper portion I provide a heavy hook $h$, having a sharp prong $h'$ at its lower end, and the combined height of this prong and the pots corresponds approximately to the usual distance between two rungs of an ordinary ladder. This, taken with the flat bottom and oblong shape of the paint-pots, makes it feasible to support them, as indicated at the lower portion of Fig. 3, this being a great convenience to house-painters, or, if it is preferred not to support the pots in that manner, they may be hung, as indicated at the left-hand side of Fig. 3, simply by jabbing the prong into any convenient piece of wood—as, for instance, the staging, cornice, or other projecting part.

In modern house-painting it is usual to provide at least three colors, one for the body or groundwork, another for the main trimming, and a third for sills, &c., and accordingly I have devised my present invention for facilitating the work of the painter in these respects, so that instead of being obliged to use one paint over a large extent of surface and then run back for a pot of a different color of paint, and so on, at a great disadvantage and waste of time he simply carries all three colors in practically one device, which can be conveniently manipulated by one hand, and carries on the work of applying the three colors uniformly. If, on the other hand, he does not wish to use more than one paint he simply disengages one of the pots and uses it alone in the usual way.

The embodiment of my invention herein shown avoids the use of soldered joints and extraneous appliances and provides a construction which can be struck up from one piece of metal, thereby facilitating without injury the well-known process of "burning out" the pot when it has become clogged with hardened paint.

My combination paint-pot is self-contained in that it simply unites the separate pots themselves without requiring any additional supporting device, carrier, connection, or other appliance.

Another important advantage in my invention is the quickness with which the parts may be assembled and locked together or taken apart, and the construction is also of advantage in not having any concealed or intricate fastening means, joints, or appurtenances liable to become filled and clogged with paint.

Without undertaking to set forth all the advantages or the many other embodiments of my invention which may be resorted to without departing from the spirit and scope thereof, what I claim, and desire to secure by Letters Patent, is—

1. A device of the kind described, comprising a plurality of paint-pots having corresponding sides arranged to abut one against each other, and provided with mutually interlocking means for constituting a handle and detachably securing them together.

2. A device of the kind described, comprising two rectangular paint-pots having similar extensions on corresponding sides cut away to form handles, and provided with interlocking portions for detachably joining the pots together.

3. In a device of the kind described, a paint-pot having at one side a handle formed with an internal opening, combined with another paint-pot having at one side a handle provided with oppositely-extending lips adapted to detachably engage said other handle at the opposite edges of said opening.

4. A device of the kind described, comprising two paint-pots having extensions at corresponding sides, one extension being provided at its upper portion with a short upturned lip, and at its lower portion with a longer downturned lip, and the other extension having an opening whose upper edge is adapted to engage said upturned lip, and whose lower edge is adapted to be retained by said downturned lip.

5. A device of the kind described, comprising two paint-pots having extensions at corresponding sides, one extension being provided at its upper portion with a short upturned lip, and at its lower portion with a longer downturned lip, and the other extension having an opening whose upper edge is adapted to engage said upturned lip, and whose lower edge is adapted to be retained by said downturned lip, and a third pot provided with hooks for engaging said first-mentioned pots when joined together.

6. In a device of the kind described, a plurality of paint-pots detachably secured together, and provided with sharp prongs for removably supporting the paint-brushes, and also with spring-clips for holding small brushes.

In testimony whereof I have signed my name to this specification in the presence of two subscribing witnesses.

THOMAS R. HINES.

Witnesses:
 FRANK M. JOY,
 GEO. H. MAXWELL.